(12) United States Patent
Benigno et al.

(10) Patent No.: US 7,992,768 B2
(45) Date of Patent: Aug. 9, 2011

(54) CASH REGISTER TRAY

(76) Inventors: Greg A Benigno, Stockton, CA (US);
Jeff Gianelli, Stockton, CA (US)

(\*) Notice: Subject to any disclaimer, the term of this patent is extended or adjusted under 35 U.S.C. 154(b) by 764 days.

(21) Appl. No.: 12/053,165

(22) Filed: Mar. 21, 2008

(65) Prior Publication Data

US 2009/0236431 A1  Sep. 24, 2009

(51) Int. Cl.
*G07G 1/00* (2006.01)
(52) U.S. Cl. ......... 235/7 R; 235/7 A; 235/379; 235/383; 705/14.37; 705/14.38; 705/16; 705/43
(58) Field of Classification Search .................. 235/7 R, 235/379, 383; 705/14.37, 14.38, 16, 43
See application file for complete search history.

(56) References Cited

U.S. PATENT DOCUMENTS

| 3,730,110 | A | * | 5/1973 | Peters | 109/25 |
| 3,828,166 | A | * | 8/1974 | Johansson et al. | 235/7 A |
| 4,522,275 | A | | 6/1985 | Anderson | |
| 4,646,767 | A | | 3/1987 | Hikita | |
| 5,512,877 | A | * | 4/1996 | Gels et al. | 340/570 |
| 5,756,977 | A | * | 5/1998 | Biss | 235/7 R |
| 5,947,257 | A | * | 9/1999 | Schwartz | 194/224 |
| 6,550,671 | B1 | * | 4/2003 | Brown et al. | 235/379 |
| 6,772,941 | B1 | | 8/2004 | Carter | |
| 6,896,177 | B2 | | 5/2005 | Carter | |
| 7,116,226 | B1 | * | 10/2006 | Pollard | 340/570 |
| 2003/0155418 | A1 | * | 8/2003 | Daugs et al. | 235/383 |
| 2009/0011510 | A1 | * | 1/2009 | Kale et al. | 435/468 |

\* cited by examiner

*Primary Examiner* — Thien M. Le
*Assistant Examiner* — Tuyen K Vo
(74) *Attorney, Agent, or Firm* — Dale J. Ream

(57) ABSTRACT

A cash register tray includes a base tray having a plurality of change compartments and a plurality of weight sensors, each weight sensor being configured to determine content weight of a respective change compartment. The cash register tray includes a processor in data communication with each weight sensor. Data input and output devices are in data communication with the processor. The processor includes programming for associating each compartment with a respective monetary denomination and monetary value, an initial monetary value and content weight using weight sensor data. The processor includes programming for adding value to respective compartment values if change is added to a compartment as sensed by the input device or weight sensors and for subtracting value from a respective compartment value as indicated by respective weight sensors. The processor divides an increase or decrease by a predetermined value after each transaction to account for coin weight variations.

20 Claims, 7 Drawing Sheets

CASH REGISTER TRAY

BACKGROUND OF THE INVENTION

This invention relates generally to cash register trays and, more particularly, to a cash register tray that keeps track of the amount of money in each compartment of the drawer, especially the coinage.

The amount of money stored in a cash register drawer must be counted at various times-particularly at the end of an employee's shift or at the end of the day. Counting the money within a drawer can be tedious task and one that is prone to error, especially as it concerns counting the coinage. Errors may be detected if the amount of cash or change does not equal the electronic or manual transaction records.

Various devices have been proposed in the art that keep track of the amount of cash and coinage in a cash register tray. For example, some proposals have been made for cash register trays that include scales for weighing the various coin trays so as to determine the amount of coinage contained therein. Although assumably effective for their intended purposes, the existing devices do not account for various errors that may be experienced when using scales as large numbers of coins are received and distributed and especially those relating to weight variations of various denominations of coins.

Therefore, it would be desirable to have a cash register tray that includes scales underneath each coin tray for weighing and tabulating the quantity of coins and their value. Further, it would be desirable to have a cash register tray that avoids damage to the scales caused by a user striking new coin rolls on tray compartments. In addition, it would be desirable to have a cash register tray having a processor that implements a methodology of evaluating the number of coins in the drawer after every transaction and avoids errors that may be introduced due to coin weight variations.

SUMMARY OF THE INVENTION

Therefore, a cash register tray according to the present invention includes a base tray having a plurality of change compartments and a plurality of weight sensors, each weight sensor being configured to determine content weight of a respective change compartment. The cash register tray includes a processor in data communication with each weight sensor. A data input device and a data output device is in data communication with the processor.

The processor includes programming for associating each compartment with a respective monetary denomination and a respective predetermined value based thereon. There is also programming for associating a respective initial value with each compartment and associating a respective content weight with each compartment using data from the weight sensors. The processor includes programming for adding a predetermined monetary value to the initial value of a respective compartment upon: (a) receiving data from the data input device indicating that change has been added to the respective compartment; and (b) detecting an increase in content weight for that compartment using the weight sensor and determining that the increase in content weight is within a predetermined range related to the monetary denomination of the compartment.

In addition, the processor includes programming for adding a determined monetary value to the initial value and any added predetermined monetary value of a respective compartment upon: (a) detecting an increase in content weight for a compartment using the weight sensor; and (b) dividing the increase in content weight by the predetermined value for the compartment and rounding the result to the nearest whole number; the determined monetary value being the nearest whole number or a value associated therewith. Then, the processor is programmed for subtracting a determined value from a sum of the initial value, any added predetermined monetary value, and any added determined monetary value of a respective compartment upon: (a) detecting a decrease in content weight for the compartment using the weight sensor; and (b) dividing the decrease in content weight by the predetermined value for the compartment and rounding the result to the nearest integer; the determined value being the nearest integer or a value associated therewith. And then, the processor includes programming for actuating the data output device to display the initial value plus any added predetermined monetary value plus any added determined monetary value minus any subtracted determined value for at least one compartment.

Therefore, a general object of this invention is to provide a cash register tray that keeps track of a present value of coinage in the tray.

Another object of this invention is to provide a cash register tray, as aforesaid, that accounts for variations in coin weight so as to maintain accurate tabulations.

Still another object of this invention is to provide a cash register tray, as aforesaid, that provides an alert if more of a particular denomination of coinage needs to be added to the tray.

Yet another object of this invention is to provide a cash register tray, as aforesaid, having a striker plate so as to avoid damage to its scales.

A further object of this invention is to provide a cash register tray, as aforesaid, that correlates an actual monetary value in the tray with transactional data.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is an isolated view on an enlarged scale taken from a portion of FIG. 2a;

FIG. 3b is an isolated view on an enlarged scale taken from a portion of FIG. 3a;

DESCRIPTION OF THE PREFERRED EMBODIMENT

A cash register tray will now be described in detail with reference to FIG. 1 through FIG. 7 of the accompanying drawings. More particularly, the cash register tray 100 includes a base tray 110 and a plurality of weight sensors 120.

Figure 1:
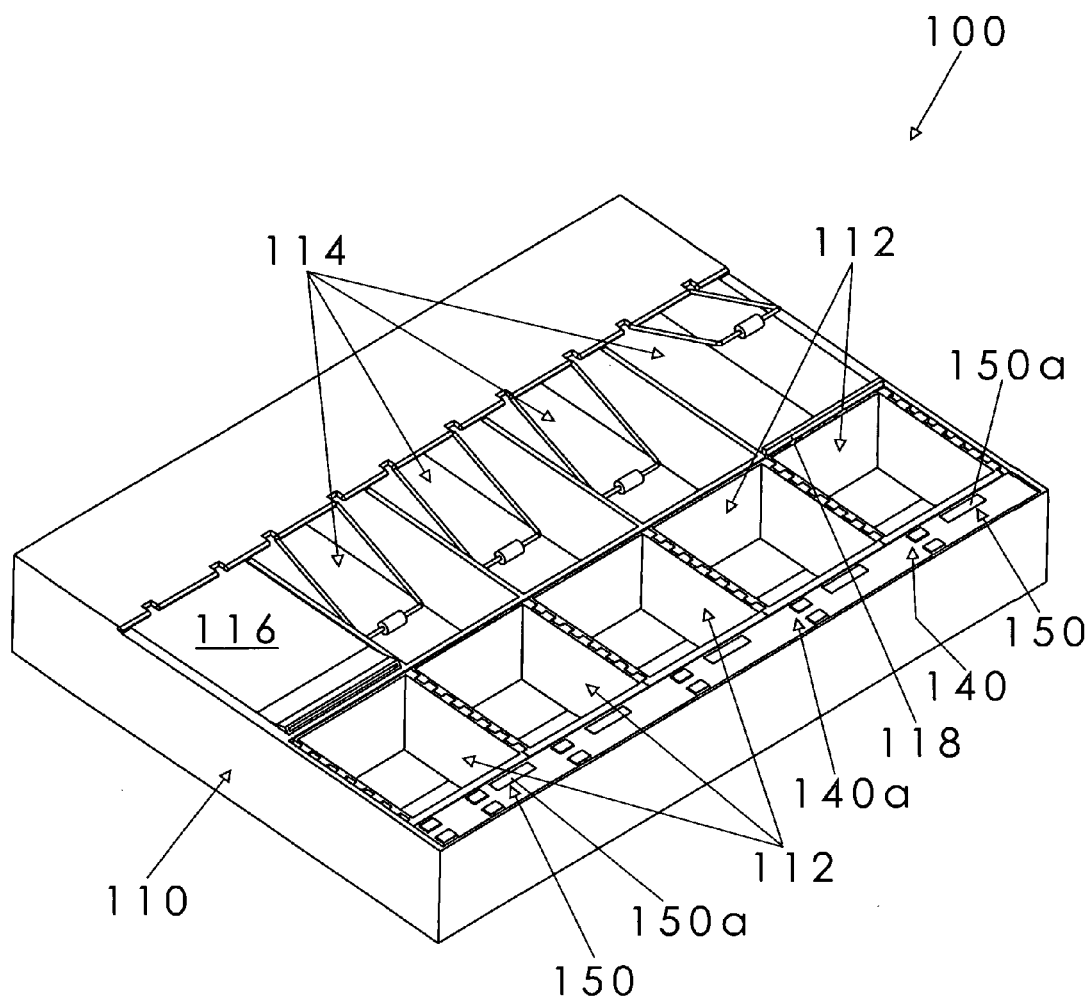
FIG. 1 is a perspective view of a cash register tray according to a preferred embodiment of the present invention.
Figure 2A:
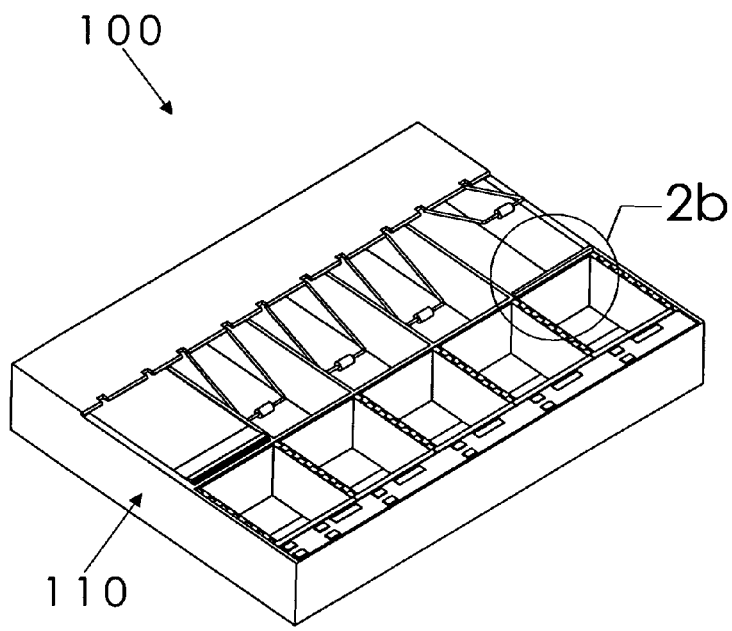
FIG. 2a is another perspective view of the cash register tray as in FIG. 1.
Figure 2B:
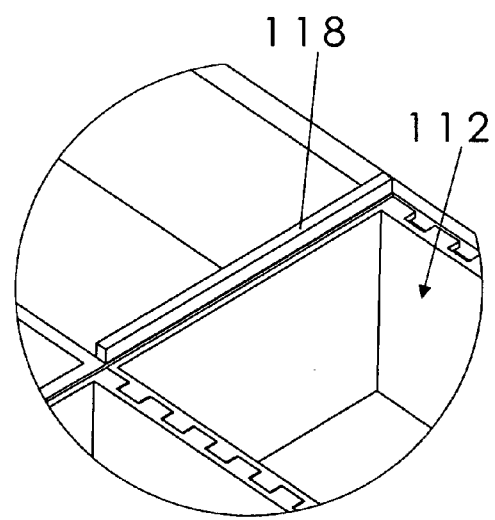
Figure 3A:
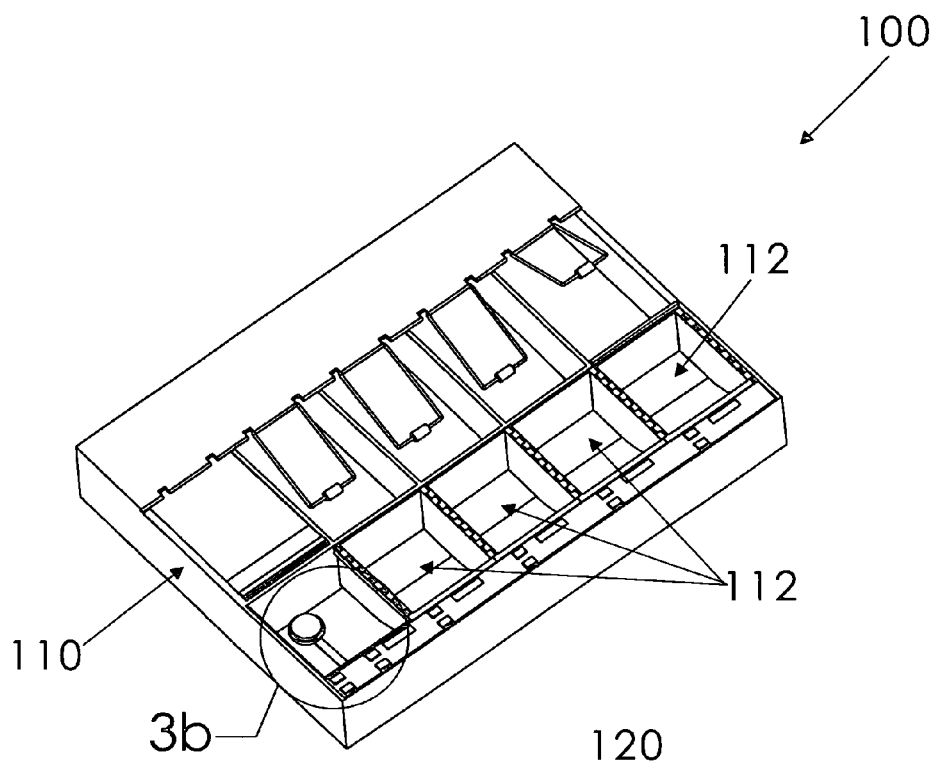
FIG. 3a is a perspective view of the cash register tray as in FIG. 1 with a compartment being removed for clarity.
Figure 3B:
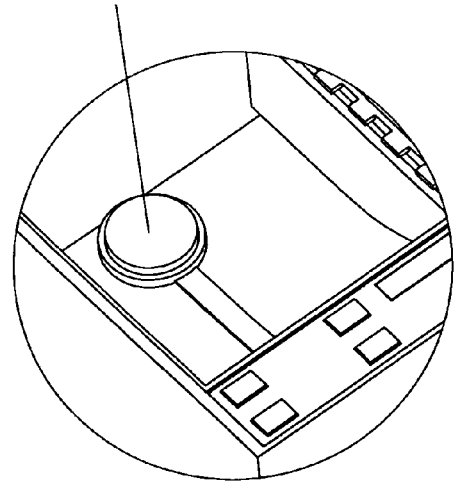

As shown in FIG. 1, the base tray 110 has a plurality of change compartments 112. Each weight sensor 120 is configured to determine content weight of a respective change compartment 112. For example, as shown in FIGS. 2a and 3a, a respective weight sensor 120 may be positioned beneath each respective compartment 112, and the compartments 112 may "float" (i.e., move up and down) inside the base tray 110. The compartments 112 may be removable from the base tray 110, as shown in FIG. 3a. The base tray 110 may further include a plurality of paper currency compartments 114 and/or a lock box 116 (FIG. 1). As shown in detail in FIG. 2b, a striker plate 118 may be separated from the weight sensors 120 and the associated compartments 112 so that use of the striker plate (i.e., to open a roll of coins) does not affect any of the weight sensors 120.

Figure 7:
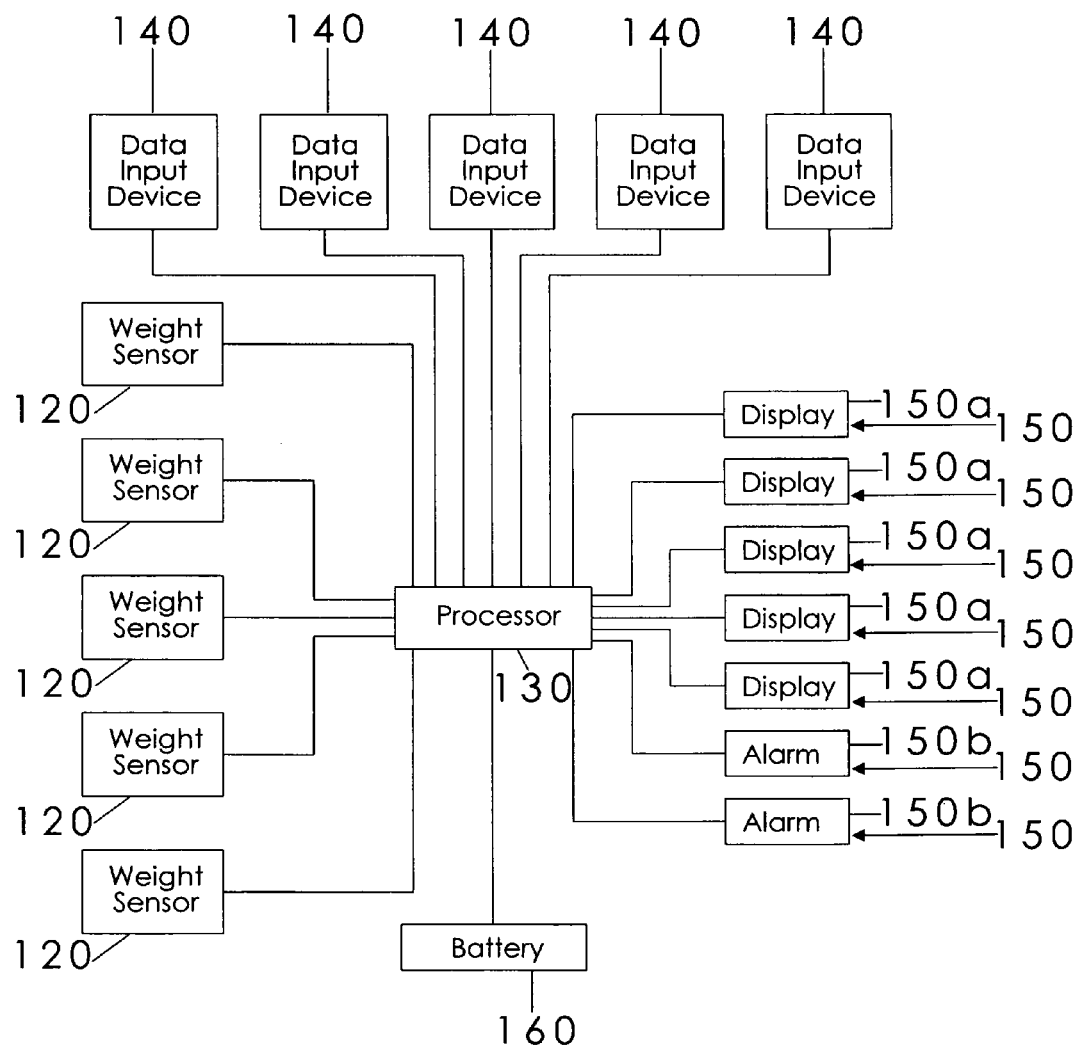
FIG. 7 is a block diagram illustrating the electronic components of the cash register tray.

A processor 130 is in data communication with each weight sensor 120, at least one data input device 140, and at least one data output device 150, as shown in FIG. 7. In one embodiment, as shown in FIG. 1, buttons 140a adjacent each respective change compartment 112 are data input devices 140, and displays 150a adjacent each respective change compartment 112 are data output devices 150. A data output 150 may also, or alternately, include an alarm 150b (e.g., a display, a light, etc.) that is distant from the change compartments 112; alarm 150b may even be distant from the base tray 110 (e.g., alarm 150b may be located at a manager's station, etc.). Means for powering the processor 130, the weight sensors 120, the data input devices 140, and the data output devices 150 (e.g., one or more battery 160, alternating current power, etc.) may be included, as shown in FIG. 7.

The processor 130 includes various programming, including programming that associates each compartment 112 with a respective monetary denomination (e.g., penny, nickel, dime, quarter) and a respective predetermined value based on the monetary denomination. In one embodiment, the predetermined values based on the monetary denominations are average weights of the denominations. For example, the predetermined value based on the penny may be between about 2.5 grams and about 3.1 grams (and preferably about 2.7 grams), and the predetermined value based on the nickel may be between about 4.92 grams and about 5 grams (and preferably about 5 grams). The predetermined values may change over time with changes in composition of coins.

The processor 130 also includes programming for associating a respective initial value with each compartment 112 and associating a respective content weight with each compartment 112 using data from the weight sensors 120. The initial value may be a dollar value or a number of coins and may be based on the contents of the respective compartment 112 before any change in the contents occurs (i.e., before coins are added or removed).

Additional programming in the processor 130 adds a predetermined monetary value to the initial value of a respective compartment 112 upon: (a) receiving data from a respective input device 140 indicating that change has been added to the respective compartment, and (b) detecting an increase in content weight for the compartment 112 using the weight sensor 120 and determining that the increase in content weight is within a predetermined range related to the monetary denomination of the compartment 112. To correspond to the initial value, the predetermined monetary value may be a dollar value or a number of coins (i.e., if the initial value is a dollar value, the predetermined monetary value should be a dollar value), and the predetermined monetary value may further be based on a typical roll of coins. For example, the predetermined monetary value for a compartment 112 housing pennies may be $0.50 dollars or 50 coins, as a typical roll of pennies includes fifty pennies; the predetermined monetary value for a compartment 112 housing nickels may be $2.00 or 40 coins, as a typical roll of nickels includes forty nickels; etc. The predetermined range may be the number of coins in a typical roll multiplied by the range of average weights for the particular denomination. For example, the predetermined range for a compartment 112 housing pennies may be about 125 grams to about 155 grams; the predetermined range for a compartment 112 housing nickels may be about 196.8 grams to about 200 grams; etc.

Figure 5:
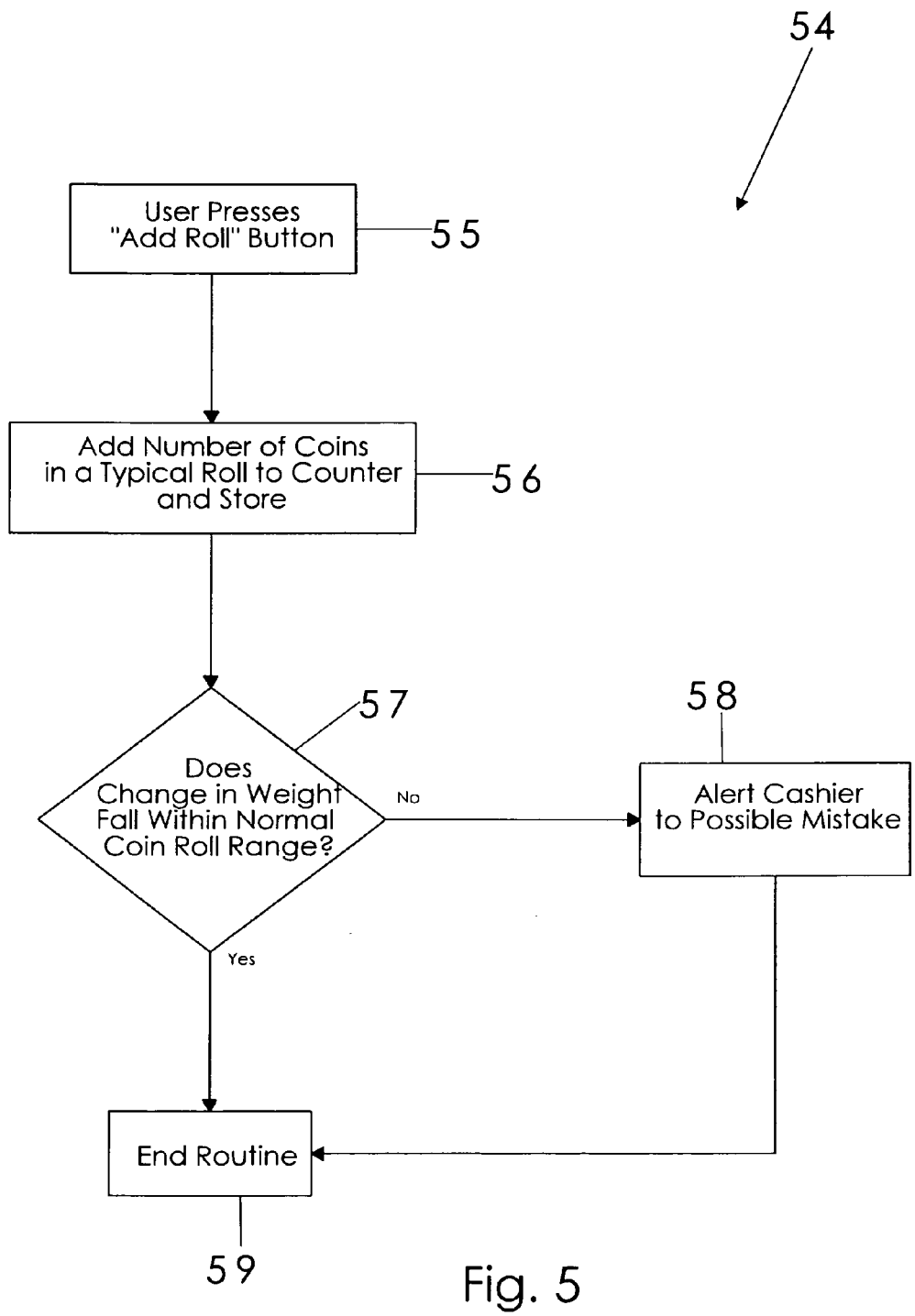
FIG. 5 is another flowchart illustrating the logic of the processor.

FIG. 5 is a flowchart 54 that shows the programming that adds a predetermined monetary value in use. At step 55, the user presses the button 140a adjacent the compartment 112 that will receive a roll of coins. The user then adds the roll of coins to the compartment 112 at step 56. At step 57, the processor 130 receives data from the input device 140a, detects an increase in content weight for the compartment 112 using the weight sensor 120, and determines if the increase in content weight is within the predetermined range related to the monetary denomination of the compartment 112. If so, the routine stops at step 59; if not, the processor 130 alerts the cashier or a supervisor to a possible mistake at step 58, such as through actuating a respective data output device 150. The routine proceeds from step 58 to step 59, as shown.

Further programming in the processor 130 adds and subtracts determined monetary values to the initial value and any added predetermined monetary value for each respective compartment 112 upon: (a) detecting a change in content weight for the respective compartment 112 using the weight sensor 120; and (b) dividing the change in content weight by the predetermined value for the compartment 112 and rounding the result to the nearest whole number. If the change in content weight is an increase, the determined monetary value is added to the initial value and any added predetermined monetary value; if the change in content weight is a decrease, the determined monetary value is subtracted from the sum of the initial value, any added predetermined monetary value, and any added determined monetary value. To correspond to the initial value, the determined monetary value may be a dollar value or a number of coins (i.e., if the initial value is a dollar value, the determined monetary value should be a dollar value).

Figure 4:
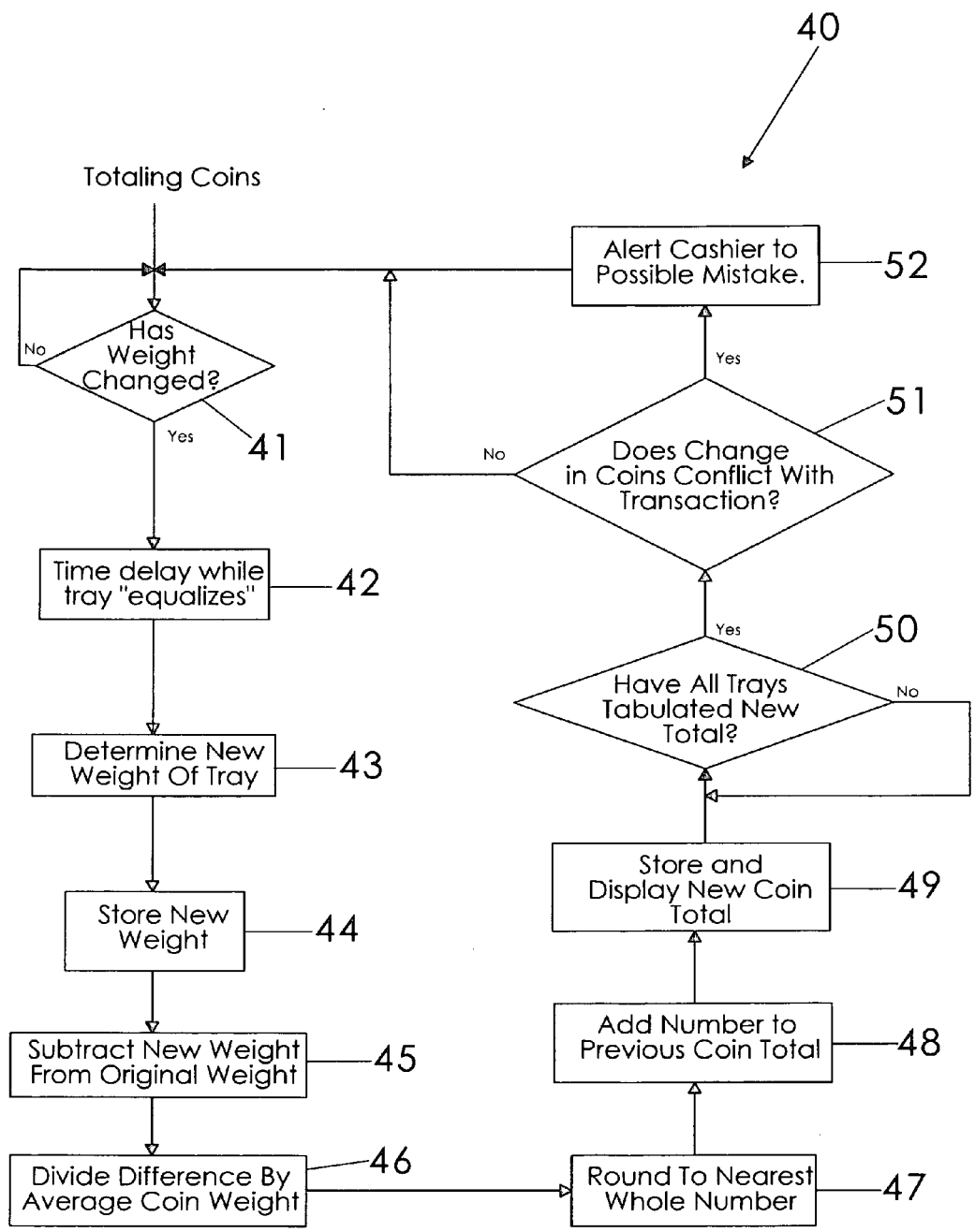
FIG. 4 is a flowchart illustrating the logic of the processor.

FIG. 4 is a flowchart 40 that shows the programming that adds and subtracts a determined monetary value in use. At step 41, the processor determines if the content weight for a respective compartment 112 has changed; if so, the routine proceeds to step 42. At steps 42 and 43, the weight sensor 120 delays and then determines the content weight of the compartment 112. By delaying, the compartment 112 is allowed to "equalize", or in other words, stop moving, before the content weight is determined. At steps 44 and 45, the processor 130 stores the new content weight and obtains the difference between the new content weight and the previous content weight. At steps 46 and 47, the processor 130 divides the difference calculated in step 45 by the predetermined value for the respective compartment and rounds the result to the nearest whole number. At step 48, the nearest whole number or a value associated therewith (e.g., $0.04 if four pennies are added or removed) is added or subtracted to the previous value of the compartment 112, depending on whether the weight increased or decreased and on whether the initial value is a dollar value or a number of coins.

It should be understood that the programming of the processor 130, as shown in FIG. 4, does not merely calculate a new weight of a compartment and divide by an average weight of coins of that denomination whereby to determine a present value or number of coins in a compartment. To do so would introduce the potential for coin weight variations to introduce errors into the system, especially over time as coins having weight variations are repeatedly added and removed. As described above, the difference between a previous weight and a new weight is calculated and then this difference is divided by a predetermined average weight and the result is rounded. In that this unique process is followed after every transaction, errors in keeping an accurate total in the respective compartment are minimized.

Programming in the processor 130 may cause the processor 130 to actuate the data output device(s) 150 to display the values of the respective compartments 112, or in other words, the initial value plus any added predetermined monetary value plus any added determined monetary value minus any subtracted determined value for each compartment 112. In one embodiment, each display 150*a* is actuated to show the value of the adjacent compartment 112. Step 49 of flowchart 40 (FIG. 4) shows the values of the compartments 112 being displayed.

In one embodiment, the processor 130 receives transaction data and the processor 130 includes programming for determining if a total of all added predetermined monetary value plus all added determined monetary values minus all subtracted determined monetary values corresponds to the transaction data. Steps 50 and 51 of flowchart 40 (FIG. 4) show this programming in use. For example, if the transaction requires a customer to receive $0.14 in change, and if the processor determines that a quarter has been added to a change compartment 112 and that a dime and a penny have been removed from respective change compartments 112, the transaction data corresponds to the total. The processor 130 may also include programming for alerting the cashier or a supervisor to a possible mistake, such as through actuating a respective data output device 150. Step 52 of flowchart 40 (FIG. 4) shows this programming in use.

In one embodiment, the processor 130 includes programming for associating each compartment 112 with a respective minimum value and actuating an output device 150 (e.g., an alarm distant from the base tray 110) if the initial value plus any added predetermined monetary value plus any added determined monetary value minus any subtracted determined monetary value for any respective compartment 112 is below the minimum value of the compartment 112.

Figure 6:
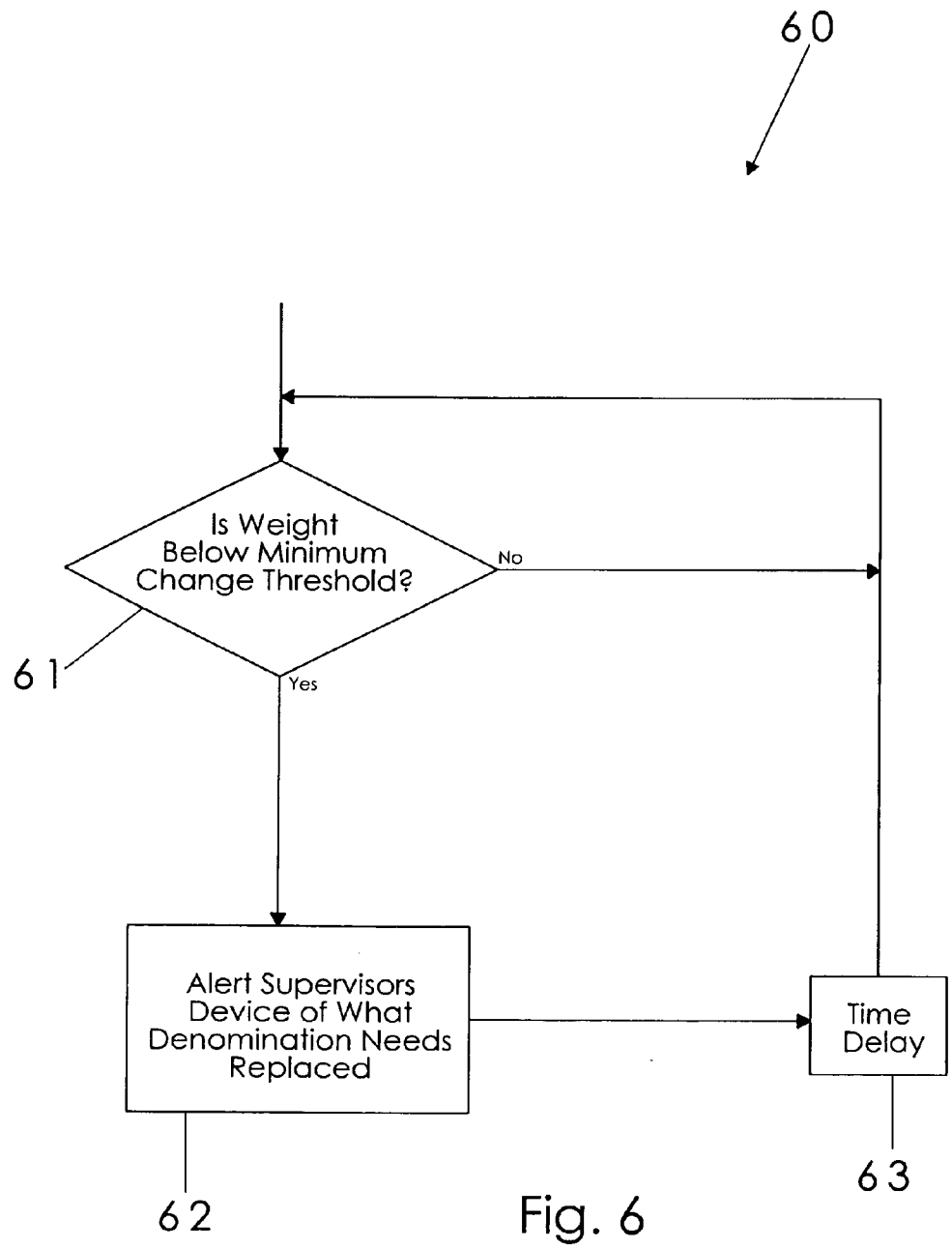
FIG. 6 is another flowchart illustrating the logic of the processor.

FIG. 6 is a flowchart 60 that shows the programming that involves minimum values in use. At step 61, the processor determines if the content weight for a respective compartment 112 is below the compartment's minimum value. If so, the processor 130 actuates one or more output device 150 at step 62. After a time delay at step 63, the routine returns from step 62 to step 61. By alerting a manager or someone away from the base tray 110 that specific coins are needed, the problem can be remedied without the cashier leaving the base tray 110.

In use, a cashier may add coins to and subtract coins from respective compartments 112, and the processor 130 may actuate one or more data output device 150 to provide various notifications, as set forth above. By using the striker plate 118 to open coin rolls, the weight sensors 120 may be undisturbed. Through using the above programming, the weight sensors 120 may be less sensitive than would otherwise be required, as using a running total and the method of adding rolls of coins to compartments 112 as described above may reduce the necessity for precise weight sensors 120. Further, errors in tabulation resulting from coin weight variations are minimized by weighing each compartment after each transaction, determining the difference in weight (as opposed to total new weight) and dividing by a respective predetermined average weight of a respective coin.

In another embodiment, the cash register tray as described above may be incorporated into large retail cash register systems. In other words, multiple cash register trays may be configured to communicate, such as with network cables, with a server or central computer monitored by a customer service manager. This would be desirable in that a manager may be alerted automatically when a cashier needs a new roll of coins of a particular denomination. The manager may also monitor in real time the flow of coins into and out of each cash register tray. The processor may include more detailed programming such as catching a cashier's errors in making change that could result in a cash register tray having more or fewer coins than indicated on a transaction record. Such errors may be indicated by an audible or visual alarm at the cash register tray.

It is understood that while certain forms of this invention have been illustrated and described, it is not limited thereto except insofar as such limitations are included in the following claims and allowable functional equivalents thereof.

The invention claimed is:

1. A cash register tray, comprising:
 a base tray having a plurality of change compartments;
 a plurality of weight sensors, each said weight sensor being configured to determine content weight of a respective change compartment;
 a processor in data communication with each said weight sensor;
 a data output device in data communication with said processor;
 a data input device in data communication with said processor;
 means for powering said processor, said weight sensors, and said data output device; and
 programming in said processor for:
  associating each said compartment with a respective monetary denomination and a respective predetermined value based thereon;
  associating a respective initial value with each said compartment;
  associating a respective content weight with each said compartment using data from said weight sensors;
  adding a predetermined monetary value to said initial value of a respective compartment upon: (a) receiving data from said data input device indicating change has been added to said respective compartment; and (b) detecting an increase in content weight for said compartment using said weight sensor and determining that said increase in content weight is within a predetermined range related to said monetary denomination of said compartment;
  adding a determined monetary value to said initial value and any said added predetermined monetary value of a respective compartment upon: (a) detecting an increase in content weight for said compartment using said weight sensor; and (b) dividing said increase in content weight by said predetermined value for said compartment and rounding the result to the nearest whole number; said determined monetary value being said nearest whole number or a value associated therewith; and
  subtracting a determined value from a sum of said initial value, any said added predetermined monetary value, and any said added determined monetary value of a respective compartment upon: (a) detecting a decrease in content weight for said compartment using said weight sensor; and (b) dividing said decrease in content weight by said predetermined value for said compartment and rounding the result to the nearest integer; said determined value being said nearest integer or a value associated therewith; and actuating said data output device to display said initial value plus any added predetermined monetary value plus any added determined monetary value minus any subtracted determined value for at least one said compartment.

2. The cash register tray of claim 1, wherein said change compartments are removable from said base tray.

3. The cash register tray of claim 1, further comprising a striker plate separated from each said weight sensor, whereby use of said striker plate does not affect any said weight sensor.

4. The cash register tray of claim 1, wherein said base tray has a plurality of paper currency compartments.

5. The cash register tray of claim 1, wherein:
said processor receives transaction data;
said processor includes programming for determining if a total of all said added predetermined monetary value plus all said added determined monetary values minus all said subtracted determined values corresponds to said transaction data; and
said processor includes programming for actuating at least one of said output device and an alarm if said total of all said added predetermined monetary value plus all said added determined monetary values minus all said subtracted determined values does not correspond to said transaction data.

6. The cash register tray of claim 5, wherein said alarm is distant from said base tray.

7. The cash register tray of claim 1, further comprising programming in said processor for:
associating each said compartment with a respective minimum value; and
actuating at least one of said output device and a first alarm if said initial value plus any added predetermined monetary value plus any added determined monetary value minus any subtracted determined value for at least one said compartment is below said respective minimum value of said compartment.

8. The cash register tray of claim 7, wherein said first alarm is distant from said base tray.

9. The cash register tray of claim 7, wherein:
said processor receives transaction data;
said processor includes programming for determining if a total of all said added predetermined monetary value plus all said added determined monetary values minus all said subtracted determined values corresponds to said transaction data; and
said processor includes programming for actuating at least one of said output device, said first alarm, and a second alarm if said total of all said added predetermined monetary value plus all said added determined monetary values minus all said subtracted determined values does not correspond to said transaction data.

10. The cash register tray of claim 9, further comprising a striker plate separated from each said weight sensor, whereby use of said striker plate does not affect any said weight sensor.

11. The cash register tray of claim 1, wherein:
said initial value is a dollar value;
said predetermined monetary value is a dollar value;
said determined monetary value is a dollar value; and
said determined value is a dollar value.

12. The cash register tray of claim 1, wherein:
said initial value is a number of coins;
said predetermined monetary value is a number of coins;
said determined monetary value is a number of coins; and
said determined value is a number of coins.

13. The cash register tray of claim 1, wherein:
one said monetary denomination is penny and said predetermined value based thereon is between about 2.5 grams and about 3.1 grams; and
another said monetary denomination is nickel and said predetermined value based thereon is between about 4.92 grams and about 5 grams.

14. The cash register tray of claim 13, wherein:
said predetermined range related to said penny is about 125 grams to about 155 grams; and
said predetermined range related to said nickel is about 196.8 grams to about 200 grams.

15. The cash register tray of claim 14, wherein
said predetermined value based upon said penny is about 2.7 grams; and
said predetermined value based upon said nickel is about 5 grams.

16. A cash register tray, comprising:
a base tray having a plurality of change compartments;
a plurality of weight sensors, each said weight sensor being configured to determine content weight of a respective change compartment;
a plurality of displays, a respective display being adjacent each said change compartment;
a plurality of input devices, a respective input device being adjacent each said change compartment;
a processor in data communication with each said weight sensor, each said display, and each said input device;
means for powering said processor, said weight sensors, said displays, and said data input devices; and
programming in said processor for:
associating each said compartment with a respective monetary denomination and a respective predetermined value based thereon;
associating a respective initial value with each said compartment;
associating a respective content weight with each said compartment using data from said weight sensors;
adding a predetermined monetary value to said initial value of a respective compartment upon: (a) receiving data from said adjacent data input device indicating change has been added to said respective compartment; and (b) detecting an increase in content weight for said compartment using said weight sensor and determining that said increase in content weight is within a predetermined range related to said monetary denomination of said compartment;
adding a determined monetary value to said initial value and any said added predetermined monetary value of a respective compartment upon: (a) detecting an increase in content weight for said compartment using said weight sensor; and (b) dividing said increase in content weight by said predetermined value for said compartment and rounding the result to the nearest whole number; said determined monetary value being said nearest whole number or a value associated therewith; and
subtracting a determined value from a sum of said initial value, any said added predetermined monetary value, and any said added determined monetary value of a respective compartment upon: (a) detecting a decrease in content weight for said compartment using said weight sensor; and (b) dividing said decrease in content weight by said predetermined value for said compartment and rounding the result to the nearest integer; said determined value being said nearest integer or a value associated therewith; and actuating each said data output device to display said initial value plus any added predetermined monetary value plus any added determined monetary value minus any subtracted determined value for said adjacent compartment.

17. The cash register tray of claim 16, wherein:

said processor receives transaction data;

said processor includes programming for determining if a total of all said added predetermined monetary value plus all said added determined monetary values minus all said subtracted determined values corresponds to said transaction data; and said processor includes programming for actuating at least one said output device or an alarm if said total of all said added predetermined monetary value plus all said added determined monetary values minus all said subtracted determined values does not correspond to said transaction data.

18. The cash register tray of claim 17, further comprising programming in said processor for:

associating each said compartment with a respective minimum value; and actuating at least one said output device or a first alarm if said initial value plus any added predetermined monetary value plus any added determined monetary value minus any subtracted determined value for at least one said compartment is below said respective minimum value of said compartment.

19. The cash register tray of claim 18, wherein:

said processor receives transaction data;

said processor includes programming for determining if a total of all said added predetermined monetary value plus all said added determined monetary values minus all said subtracted determined values corresponds to said transaction data; and said processor includes programming for actuating at least one said output device, said first alarm, or a second alarm if said total of all said added predetermined monetary value plus all said added determined monetary values minus all said subtracted determined values does not correspond to said transaction data.

20. The cash register tray of claim 19, further comprising a striker plate separated from each said weight sensor, whereby use of said striker plate does not affect any said weight sensor; and wherein:

said change compartments are removable from said base tray; and said base tray has a plurality of paper currency compartments.

* * * * *